Feb. 18, 1930.        S. S. GOLDSMITH        1,747,542
                        LAWN MOWER
                     Filed Dec. 16, 1927
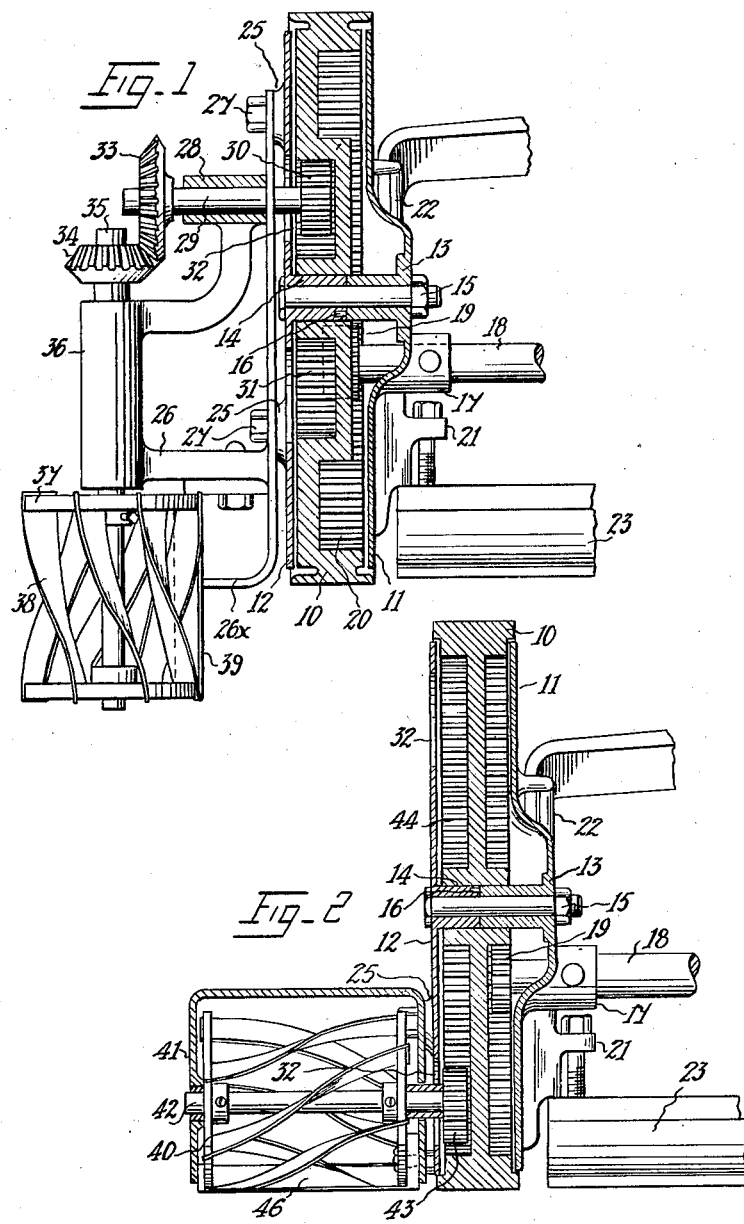
S. S. Goldsmith
      INVENTOR
By Marks & Clerk
         Attys Patented Feb. 18, 1930

1,747,542

UNITED STATES PATENT OFFICE

SEPTIMUS STANLEY GOLDSMITH, OF FIVEDOCK, NEAR SYDNEY, NEW SOUTH WALES, AUSTRALIA

LAWN MOWER

Application filed December 16, 1927, Serial No. 240,574, and in Australia February 21, 1927.

This invention relates to lawn mowers, and consists in extension attachments carrying side cutting fittings for trimming the margins and borders of grass beds.

The driver wheel is removed from one end of the mower and in its place a wheel of a novel type is fitted; this new wheel is fitted within cheek plates which enclose it and together form the end frame member of the machine. The inner cheek plate is constructed with the usual frame lugs into which the machine cross frame members are socketed, and it also carries the mounting lug to which one end of the knife bar is bolted. The two cheek plates are dowelled together at the hub to prevent relative rotation, and clearance is offered between them for the new driver wheel which is rotatable between them; the running flanges of the driver wheel overlie and shroud the edges of the cheek plates.

The driver wheel has two internal gears formed one on one side and the other on the other side of it. One of these gears corresponds with the ordinary driving gear, through which motion is transferred from the wheel to the main flier barrel of the mower, and the other of them gears into a pinion on a jack shaft or on a flier spindle which is carried on the outer cheek disc; the side cutting attachments are driven through this pinion. The outer cheek disc is provided with lugs on which an overhanging cutter blade and the spindle bearings of a small diameter flier are carried. Access holes are provided in the casing disc to facilitate the fitting of the drive pinion and its spindle.

The side cutter attachment flier barrel may be mounted on a horizontal axis or on a vertical axis, the cutter blade with which it co-acts being correspondingly disposed.

A lawn mower fitted with a side cutting attachment according to this invention may be utilized to work close up to walls or garden plots to trim off grass which cannot be reached by the ordinary flier barrel, and it may also be used for trimming off edges of grass along pathways and the like to obtain a neat finish.

The side cutting attachment, consisting of a flier and cutter blade, may be detachable from the main structure, so that it may be readily set up for use, and when not required may be removed from the machine so as to minimize risk of injury to it in the ordinary use of the mower.

In the accompanying drawing:—

Fig. 1 is a vertical sectional elevation showing the parts comprised in the invention in that arrangement in which the trimming flier barrel and its knife are disposed vertically; and Fig. 2 is a similar view showing the modified construction in the arrangement in which the trimming flier barrel and its knife are disposed horizontally. In each case only so much of the structure of the mower to which the invention is applied as is necessary for explanation of the invention has been shown.

In Fig. 1, 10 is the driver wheel, 11 the inner cheek plate, and 12 the outer cheek plate. The plates 11 and 12 are provided with integral hub portions 13 and 14 which are aligned by a bolt 15 which passes through them. 16 is a dowel peg by which the hubs are checked against relative rotation. The hubs 13—14 form an axle on which the driver wheel 10 is freely rotatable. 17 is a tubular boss on the inner cheek plate 11; it forms a bearing for the shaft 18 on which the main flier barrel is fixed. 19 is the pinion through which drive is transmitted to the shaft 18. This pinion meshes with the internal tooth gear 20 on the inner side of the driver wheel 10. 21 is a lug on the cheek plate 11 to which the end of the knife bar 23 is bolted, and 22 is another lug on the cheek plate 11 associated with the existing parts of the mower.

25 are paps on the outer cheek plate 12, and 26 is a frame detachably fixed to them by screw pins 27. This frame carries a bearing 28 for a jack shaft 29, on the inner end of which a pinion 30 is fixed. This pinion meshes with the internal tooth spur gear 31 which is formed on the outer side of the driver wheel 10. 32 is a hole in the cheek plate 12 accommodating the jack shaft 29. On its outer end the shaft 29 carries a bevel wheel 33 which meshes with a bevel pinion 34 which is carried on the top end of a vertical shaft 35. The shaft 35 is rotatable in a bearing 36 in the frame 26. The flier barrel 37 is fixed on the bottom end of the shaft 35. The knife bar which carries the knife 39 with which blades 38 of the flier barrel 37 co-acts is carried by the extension member 26ˣ of the frame 26.

The paps 25 may be so disposed that they are usable to carry a cutter of the vertical type (Fig. 1) or of the horizontal type (Fig. 2).

In the horizontal type margin cutter, the flier barrel 40 is housed in a frame 41, one side of which is pinned up to paps 25 on the cheek plate 12. 42 is its shaft and 43 a pinion on the inner overhung end of the shaft 42. This pinion meshes into the internal tooth ring gear 44 on the outer side of the driver wheel 10. The knife bar 46 is carried on the frame 41.

It will be noted that the internal toothing in the respective sides of the driver wheel 10 is not identical in the vertical and horizontal arrangement which are shown respectively in Figs. 1 and 2. In view of the smaller diameter of the outer ring gear in the Fig. 1 arrangement, the drive is speeded up between the jack shaft 29 and the flier shaft 35 by the bevel gear 33—34. The pattern of driving wheel shown in Fig. 2 may, however, be used in the Fig. 1 arrangement, the centre of the jack shaft 29 being then appropriately raised and the proportion of the gearing 33—34 approriately changed.

Either attachment being fixed, the mower is operated in the ordinary way. The rotation of the driver wheel 10 is applied through the inner ring gearing to the flier barrel, and through the outer ring gearing to the margin cutter flier or the edge trimmer flier, as the case may be.

The detail of the design and structure of the fliers is subject to modification, and I do not limit myself to the specific design or construction of the fliers as illustrated in the drawings.

What I claim as my invention and desire to secure by Letters Patent is:—

1. In a lawn mower, a double sided internally toothed driver wheel, cheek plates on the inner and outer sides of said wheel checked to prevent relative rotation and connected through a central member forming the driver wheel axle, a main flier shaft and knife bar supported by one of said cheek plates, said flier shaft driven from one of said internal gears, a margin trimming flier on a vertical shaft coacting with a fixed vertical knife, a frame supporting said margin flier and knife and detachably fixed to the other of said cheek plates, and intermediate gearing establishing a driving connection between the trimming flier and the other of said internal toothed gears.

2. In a lawn mover, a double sided internal toothed driver wheel, cheek plates on the inner and outer sides of said wheel checked to prevent relative rotation and connected through a central member forming the driver wheel axle, a main flier shaft and knife bar supported by one of said cheek plates and the flier shaft being driven from one of said internal gears, an edge trimming flier on a shaft and coacting with a fixed knife, a frame detachably fixed to the other of the cheek plates and supporting the trimming flier and and knife, and means for driving the trimming flier from the other of said internal toothed gears.

In testimony whereof I affix my signature.
SEPTIMUS STANLEY GOLDSMITH.